G. W. Bishop,

Wrench.

No. 89,461. Patented Apr. 27, 1869.

Witnesses:
A. Leller
N. Kinner

Inventor:
G. W. Bishop
pr Brown Coombs & Co
att'ys

United States Patent Office.

GEORGE W. BISHOP, OF STAMFORD, CONNECTICUT, ASSIGNOR TO THE NEW ENGLAND MANUFACTURING WORKS COMPANY.

Letters Patent No. 89,461, dated April 27, 1869.

IMPROVEMENT IN WRENCHES.

The Schedule referred to in these Letters Patent and making part of the same.

*To all whom it may concern:*

Be it known that I, GEORGE W. BISHOP, of Stamford, in the county of Fairfield, and State of Connecticut, have invented a new and useful Improvement in Pawl-Wrenches and Braces, of which the following is a full, clear, and exact description, reference being had to the accompanying drawing, forming part of this specification, and in which—

Figure 1:
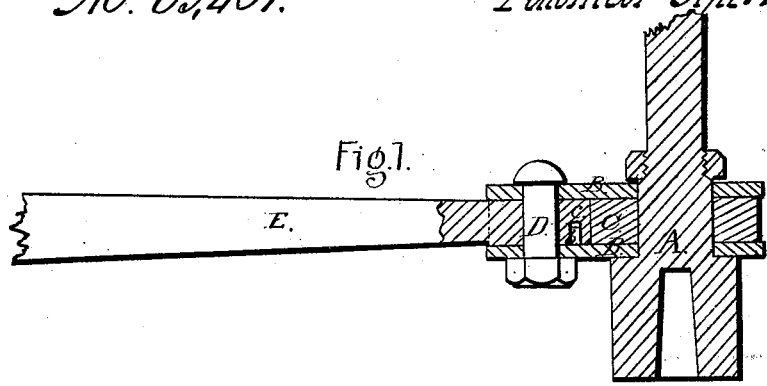
Figure 2:
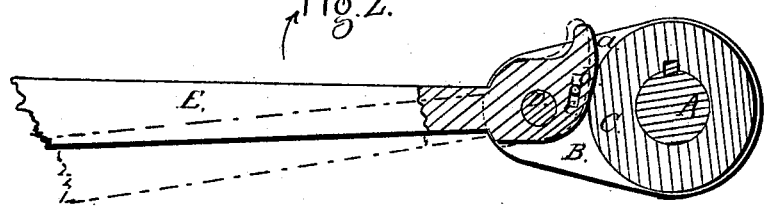

Figure 1 represents a mainly sectional longitudinal view of a pawl-wrench, or brace, constructed in accordance with my improvement;

Figure 2, a similar view thereof, taken at right angles to fig. 1; and

Figure 3:
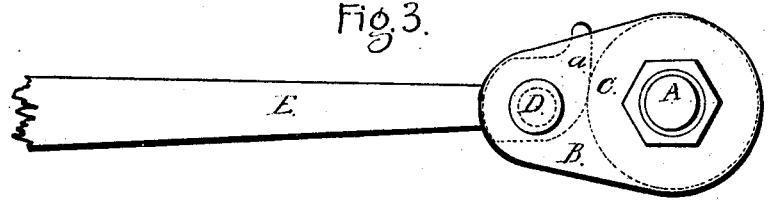

Figure 3, a longitudinal outside view of the same.

Similar letters of reference indicate corresponding parts.

This my improvement relates to a combination or arrangement of parts, in which a handle, or lever, is secured by a pivot between jaws, which are allowed to freely turn on the arbor carrying the drill, or wrench-head, and the short arm, or inner end of said lever made, by vibration of the lever in one direction, to bite on said arbor, or the smooth periphery of a disk secured thereto, while in the opposite swing of said lever, the latter is released from bite on said arbor, or its disk, the whole operating in the same manner as a ratchet-wrench, or brace, but dispensing with all ratchet-teeth, to secure the turning of the arbor in the one direction only.

In this connection, my present invention consists in a peculiar construction of the biting, or griping-end of the lever on the arbor, or its disk, whereby a more effective and durable action is secured; also, in combining with such construction, a stop-motion, that serves to limit the vibration of the lever in the jaws to a close working-connection with the arbor, or its disk.

Referring to the accompanying drawing—

A is the arbor, constructed to carry a drill, or to act as a wrench, accordingly as circumstances require, or which may be made convertible into both uses.

B B are the jaws, hung to freely turn on the arbor A, and resting on a collar to the latter, on the one side, and secured by a nut on the other.

Keyed to the arbor, between the jaws, is a disk, or wheel, C, of smooth formation on its periphery, and which may, in effect, be said to constitute an enlarged portion of the arbor.

Passing through the ears of the jaws is a pivot, or pin, D, which constitutes the fulcrum of the lever, or handle E, that is arranged to freely turn thereon.

This lever may be of any length, according to the purchase required, and has its inner and shorter arm struck of a curve, or series of curves, as at *a*, the converse of the periphery of the disk C, and so struck or arranged as that, on working the outer end of the lever in the direction indicated by the arrow in fig. 2, the curved portion *a* of the inner arm bites on the disk, and turns, or rotates the arbor, while on throwing the lever in the reverse direction, as shown by red lines in fig. 2, it is released from bite, and exerts no turning-action or effect on the disk and its arbor.

By the curvature, or curvatures given to the biting, or griping-end of the lever on the disk, a much more perfect hold is had on the disk to rotate it, as compared with a straight face, or surface to said end, and durability of the parts increased, with less chance of slipping, or less time lost in effecting a secure hold, while a quick relief or break of the gripe is established on working back the lever.

It is desirable, however, under such a construction, to secure a close working-connection of the lever and disk, and to prevent lost motion, that the play of the lever in the jaws should be limited to the amount of swing necessary for it to effect and release gripe of or on the disk, for which purpose, I provide the one jaw with a pin, or projection, *b*, and arrange the same to fit or work in a slot, *c*, made in the short arm of the lever.

Any suitable feed-motion may, if desired, be applied to the arbor to follow up the work, when the tool is operated as a brace to actuate a drill.

The advantages of this cam-formation of the lever over that shown in my former patent are, that it is more durable in itself, and it does not cut into or bruise the disk, thus rendering it also more durable; and by the introduction of the stop-pin and slot, as here arranged, the stay-pins, on each side of the cam, which hold the two jaws together, are dispensed with, thus rendering the instrument both more serviceable and less expensive to construct.

What is here claimed, and desired to be secured by Letters Patent, is—

The lever E, of curved or cam-formation on its biting-end, or face, provided with a stop-pin, *b*, operating in a slot, *c*, and pivoted in the jaws B B, in combination with the arbor, or its disk C, all constructed and arranged for operation together, as shown and described.

GEO. W. BISHOP.

Witnesses:
ALVIN WALKER,
ROBERT FAIRCHILD.